United States Patent
Bloomer et al.

(10) Patent No.: US 7,370,622 B2
(45) Date of Patent: May 13, 2008

(54) ACTIVE INDUCTION SYSTEM TUNING WITH MULTIPLE VALVES

(75) Inventors: Stephen Francis Bloomer, London (CA); John Francis Marentette, Tecumseh (CA); Richard Donald McWilliam, Shedden (CA); Yuhua Zhu, Windsor (CA)

(73) Assignee: Nahle International GmbH, Stuttgart (DE)

( * ) Notice: Subject to any disclaimer, the term of this patent is extended or adjusted under 35 U.S.C. 154(b) by 0 days.

(21) Appl. No.: 11/694,135

(22) Filed: Mar. 30, 2007

(65) Prior Publication Data

US 2007/0234992 A1    Oct. 11, 2007

Related U.S. Application Data

(60) Provisional application No. 60/743,985, filed on Mar. 30, 2006.

(51) Int. Cl.
*F02M 35/10* (2006.01)

(52) U.S. Cl. .............................. 123/184.55; 123/184.49

(58) Field of Classification Search ..... 123/184.24–26, 123/184.34–36, 184.42–44, 184.47–49, 184.55
See application file for complete search history.

(56) References Cited

U.S. PATENT DOCUMENTS 5,967,107 A * 10/1999 Karlsson et al. ....... 123/184.55

* cited by examiner

Primary Examiner—Noah P. Kamen
(74) Attorney, Agent, or Firm—Carlson, Gaskey & Olds

(57) ABSTRACT

An induction system is designed for an engine that includes a manifold having a plenum in fluid communication with primary runners. A plenum valve is arranged between first and second chambers of the plenum that are respectively in fluid communication with first and second sets of the primary runners. The plenum valve is configured to move between open and closed positions to regulate flow between the first and second chambers. A secondary runner is arranged upstream from and in fluid communication with the plenum. The secondary runner includes first and second runner portions with the second runner portion being shorter than the first runner portion. A runner valve is arranged in the secondary runner between the first and second runner portions and is configured to selectively direct flow through the first and second runner portions to the plenum to obtain a desired effective tuning length. Accordingly, the example induction system provides a more effective configuration for tuning an engine that is more simple, cost effective and easier to package.

15 Claims, 1 Drawing Sheet

ACTIVE INDUCTION SYSTEM TUNING WITH MULTIPLE VALVES

This application claims benefits to U.S. Provisional Patent Application No. 60/743,985, filed on Mar. 30, 2006.

BACKGROUND

The application relates to induction systems utilizing multiple valves for tuning an engine.

A typical modern induction system for a vehicle engine includes one or more valves used to regulate the flow through the induction system to tune the engine throughout its operating range to maximize engine performance. A typical induction system includes multiple primary runners that each supply air to one of the engine's cylinders. A plenum fluidly joins the primary runners upstream from the cylinders. The plenum receives air from a throttle body.

One example tuning configuration uses a plenum valve arranged within the plenum to regulate the flow between first and second chambers of the plenum that are respectively in fluid communication with first and second sets of primary runners. Opening or closing the plenum valve changes the effective tuning length from the throttle body to each cylinder. As a result, more than one torque peak can be provided by an engine.

The above described plenum valve has been used in combination with two additional valve configurations. The first configuration includes an individual valve provided within each primary runner. This configuration provides increased control of the torque over the engine's operating range. However, the resulting induction system is rather complicated and requires many valves, which is more difficult to package and greatly increases the cost.

The second configuration includes a spilt secondary runner arranged between the plenum and the throttle body. The split secondary runner includes a valve that is used to vary the effective diameter of the secondary runner to regulate the resonance of flow in the system. This configuration provides limited tuning at lower engine speeds.

What is needed is an induction system having minimum valves while providing effective engine tuning.

SUMMARY

An induction system is designed for an engine that includes a manifold having a plenum in fluid communication with primary runners. A plenum valve is arranged between first and second chambers of the plenum that are respectively in fluid communication with first and second sets of the primary runners. The plenum valve is configured to move between open and closed positions to regulate flow between the first and second chambers. A secondary runner is arranged upstream from and in fluid communication with the plenum. The secondary runner includes first and second runner portions with the second runner portion being shorter than the first runner portion. A runner valve is arranged in the secondary runner between the first and second runner portions and is configured to selectively direct flow through the first and second runner portions to the plenum to obtain a desired effective tuning length.

Accordingly, the example induction system provides a more effective configuration for tuning an engine that is simpler, cost effective and easier to package.

These and other features of the application can be best understood from the following specification and drawings, the following of which is a brief description.

DETAILED DESCRIPTION OF THE PREFERRED EMBODIMENT

Figure 1:
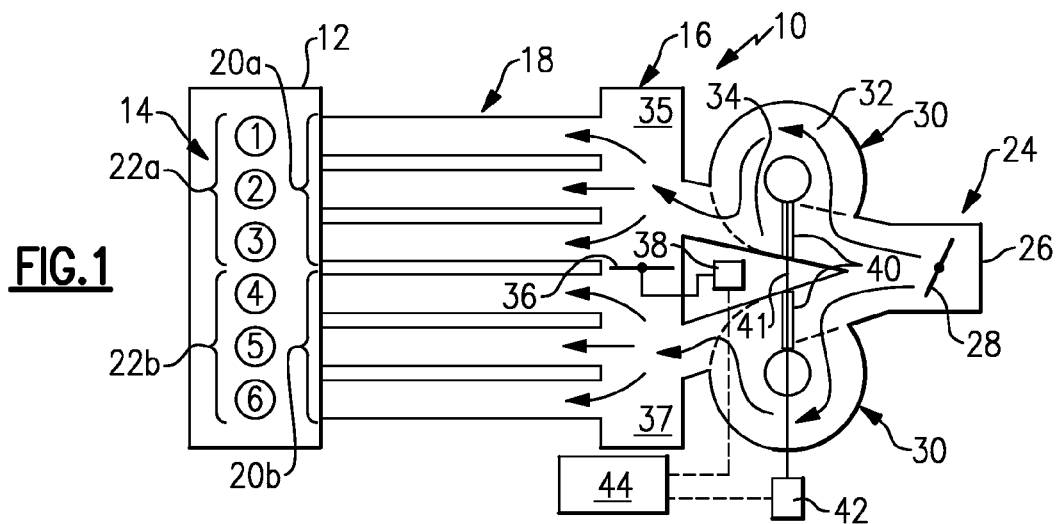
FIG. 1 is a schematic view of an example induction system with tuning valves arranged in a first configuration.

An induction system 10 is schematically shown in FIG. 1 for providing air to an engine 12. The engine 12 includes cylinders 14 that may be arranged in any configuration. For example, the cylinders 14 can be arranged in a V, in-line, or boxer arrangement. The example induction system 10 also can be used with any engine having multiple cylinders.

The induction system 10 includes a plenum 16 that supplies air to primary runners 18. The number of primary runners 18 typically corresponds to the number of cylinders 14. The primary runners 18 are grouped in sets 20a, 20b that are arranged to supply air to banks of cylinders 22a, 22b, for example.

A throttle body 24 arranged upstream from the plenum 16 supplies air to the plenum 16. Typically, the throttle body 24 includes a throttle valve 28 that regulates the supply of air into the induction system 10 from an inlet 26. The throttle valve 28 is actuated, for example, by a mechanical linkage to an accelerator pedal or an electronic control.

Secondary runners 30 fluidly interconnect the throttle body 24 to the plenum 16. In the example shown, two secondary runners 30 are provided. Each secondary runner 30 separately supplies air to first and second chambers 35, 37 of the plenum 16. A plenum valve 36 is arranged in the plenum 16 between the first and second chambers 35, 37.

The secondary runners 30 include first and second runner portions, 32, 34. In the example, the first runner portion 32 is longer than the second runner portion 34. In the example shown, a runner valve 40 is arranged is in each of the secondary runners 30 between the first and second runners portions 32, 34. The runner valves 40 selectively direct flow through either of the first and second runner portions 32, 34 in the example shown.

Figure 2:
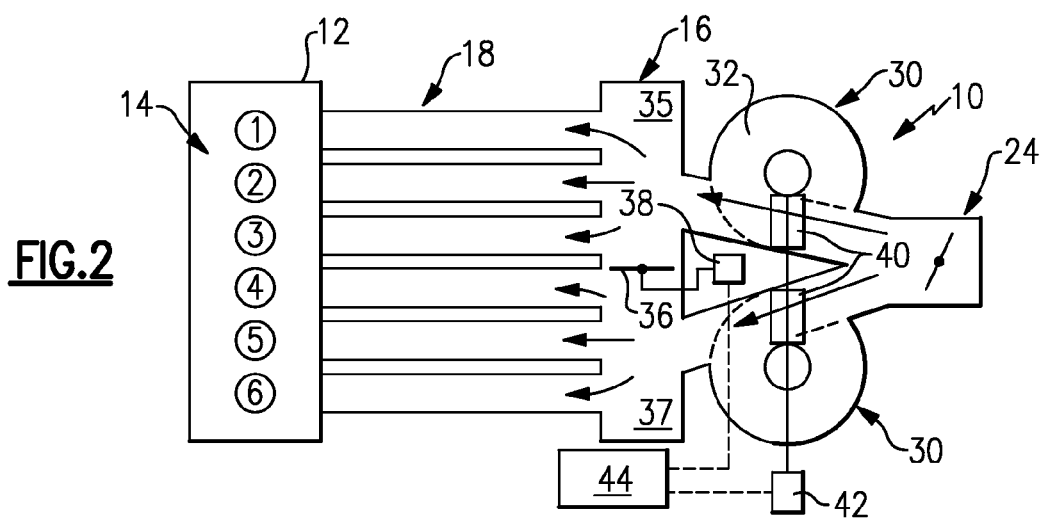
FIG. 2 is a schematic view of the example induction system shown in FIG. 1 with the tuning valves arranged in a second configuration.

In one example, a first actuator 38 is interconnected to the plenum valve 36 to move the plenum valve 36 between open and closed positions. In the example, the first and second chambers 35, 37 are substantially separated to minimize or block flow between the first and second chamber 35, 37 in the closed position (FIGS. 1 and 2). In the open position (FIG. 3), the plenum valve 36 permits the flow of air between the first and second chambers 35, 37.

The runner valves 40 are mounted on a common shaft 41 in the example arrangement. A second actuator 42 moves the runner valves 40 together between first and second positions. In the first position (FIG. 1), the flow through the second portion is blocked thereby directing flow through the first runner portion 32. In the second position (FIGS. 2 and 3), the air is permitted to flow through the second runner portion 34 generally bypassing the first runner portion 32.

A controller 44 communicates with the first and second actuators 38, 42 to operate the plenum and runner valves 36, 40 to a desired configuration in response to an engine parameter, such as engine speed. In this manner, the controller 44 achieves desired engine performance, for example, such as increasing peak torque, throughout the engine operating range.

Figure 3:
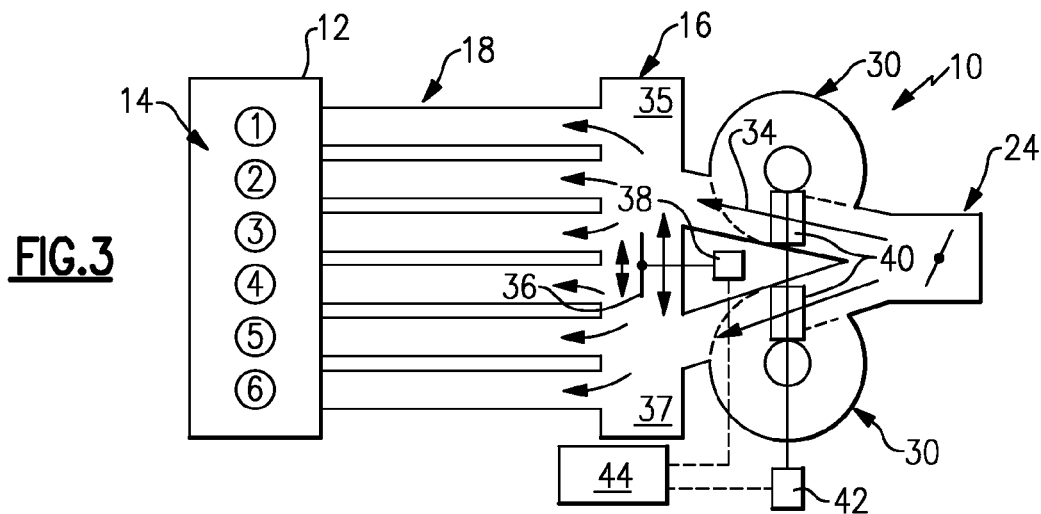
FIG. 3 is a schematic view of the example induction system shown in FIG. 1 with the tuning valves arranged in a third configuration.

Three example valve configurations are illustrated in FIGS. 1-3. FIG. 1 illustrates a desired valve configuration for low engine speeds. FIG. 2 illustrates a desired valve configuration for intermediate engine speeds. FIG. 3 illustrates a desired valve configuration for high engine speeds. The engine speeds at which the valve positions are changed are selected based upon the particular engine application.

Referring to FIG. 1, the runner valves 40 are in a first position preventing air from flowing through the second runner portion 34 and directing air to flow instead through the first runner portion 32. The plenum valve 36 is in the closed position separating the first and second chambers 35, 37 and generally preventing fluid communication between them. In the valve configuration shown in FIG. 1, the secondary runners 30 are generally long and the volume of the plenum 16 is generally small and split. As a result, the induction system 10 has long effective length runners, which at low engine speeds creates high volumetric efficiency and torque.

Referring to FIG. 2, the runner valves 40 are arranged in a second position that permits air to flow from the throttle body 24 through the second runner portion 34 into each of the first and second chambers 35, 37. The plenum valve 36 is arranged in the closed position preventing fluid communication between the first and second chambers 35, 37. In this valve configuration, the secondary runners 30 are relatively short and the separated plenum 16 provides a relatively small plenum volume. The induction system 10 provides intermediate effective length runners, which creates high volumetric efficiency and torque at intermediate engine speeds.

Referring to FIG. 3, the plenum valve 36 is moved to the open position relative to the valve configuration shown in FIG. 2. This results in an induction system 10 that has short effective length runners. The open plenum valve 36 permits a cross-flow between the first and second chambers 35, 37. The short effective length runners create high volumetric efficiency and torque at high engine speeds.

Although an example embodiment has been disclosed, a worker of ordinary skill in this art would recognize that certain modifications would come within the scope of the claims. For that reason, the following claims should be studied to determine their true scope and content.

What is claimed is:

1. An induction system for an engine comprising:
   a manifold including a plenum in fluid communication with primary runners;
   a plenum valve arranged between first and second chambers of the plenum that are respectively in fluid communication with first and second sets of the primary runners, the plenum valve configured to move between open and closed positions and regulate flow between the first and second chambers;
   a secondary runner upstream from and in fluid communication with the plenum, the secondary runner including first and second runner portions with the second runner portion shorter than the first runner portion; and
   a runner valve arranged in the secondary runner between the first and second runner portions configured to selectively direct flow through the first and second runner portions to the plenum to obtain a desired effective tuning length.

2. The induction system according to claim 1, wherein each of the first and second sets include at least two primary runners.

3. The induction system according to claim 1, wherein the closed position generally blocks flow between the first and second chambers.

4. The induction system according to claim 1, wherein the plenum is arranged between the primary and secondary runners.

5. The induction system according to claim 1, comprising a throttle body arranged upstream from the secondary runner configured to supply air thereto.

6. The induction system according to claim 1, comprising a controller commanding the plenum valve and runner valve between multiple positions to a desired valve configuration in response to an engine parameter.

7. The induction system according to claim 6, comprising first and second actuators respectively coupled to the plenum and runner valves, the controller in communication with the first and second actuators, the controller commanding the actuators to move the valves between the multiple positions in response to the engine parameter.

8. The induction system according to claim 6, wherein the engine parameter includes low, intermediate and high engine speeds.

9. The induction system according to claim 8, wherein the low engine speed corresponds to the plenum valve being in the closed position and the runner valve arranged in a first position that corresponds to permitting flow through the first runner portion and blocking flow through the second runner portion.

10. The induction system according to claim 9, wherein the intermediate engine speed corresponds to the plenum valve being arranged in the closed position and the runner valve in a second position corresponding to permitting flow through the second runner portion.

11. The induction system according to claim 10, wherein the high engine speed corresponds to the plenum valve being in the open position and the runner valve in the second position.

12. The induction system according to claim 1, comprising first and second secondary runners respectively fluidly connected to the first and second chambers.

13. The induction system according to claim 12, wherein each of the first and second secondary runners includes a runner valve.

14. The induction system according to claim 13, wherein the runner valves are supported by a common shaft and an actuator is interconnected to the shaft for moving the runner valves between first and second positions respectively corresponding to fluid flowing through the first and second runner portions.

15. The induction system according to claim 1, wherein the desired effective tuning length corresponds to a primary runner length plus an effective plenum volume plus an effective secondary runner length.

* * * * *

UNITED STATES PATENT AND TRADEMARK OFFICE
CERTIFICATE OF CORRECTION

PATENT NO. : 7,370,622 B2  
APPLICATION NO. : 11/694135  
DATED : May 13, 2008  
INVENTOR(S) : Bloomer et al.

Page 1 of 1

It is certified that error appears in the above-identified patent and that said Letters Patent is hereby corrected as shown below:

ON THE TITLE PAGE:

The Assignee should read as follows:

Item (73) Assignee: Mahle International GmbH, Stuttgart (DE)

Signed and Sealed this

Twenty-ninth Day of July, 2008

JON W. DUDAS  
*Director of the United States Patent and Trademark Office*